United States Patent
Luo et al.

(10) Patent No.: US 12,467,691 B2
(45) Date of Patent: Nov. 11, 2025

(54) METHOD AND DEVICE FOR WASTE HEAT RECOVERY IN AMMONIA-BASED DESULFURIZATION AND DECARBONIZATION SYSTEM

(71) Applicant: Jiangnan Environmental Protection Group Inc., Grand Caymen (KY)

(72) Inventors: Jing Luo, Nanjing (CN); Jinyong Wang, Nanjing (CN); Jun Zhang, Nanjing (CN); Lifang Qi, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 374 days.

(21) Appl. No.: 18/195,062

(22) Filed: May 9, 2023

(65) Prior Publication Data
US 2023/0366629 A1 Nov. 16, 2023

(30) Foreign Application Priority Data
May 16, 2022 (CN) .......................... 202210529871.7

(51) Int. Cl.
*B01D 53/34* (2006.01)
*B01D 53/14* (2006.01)
(Continued)

(52) U.S. Cl.
CPC ............ *F27D 17/10* (2025.01); *B01D 53/14* (2013.01); *C09K 5/048* (2013.01)

(58) Field of Classification Search
CPC ....... F27D 17/10; C09K 5/048; Y02B 20/129; B01D 53/343; B01D 53/504; B01D 53/62; B01D 53/78; B01D 53/14; B01D 53/1406; B01D 53/1475; B01D 53/1481; B01D 2257/504; B01D 2257/30; B01D 2257/406; B01D 2258/0283
USPC ......... 95/187, 199, 223, 224, 228, 229, 232, 95/235, 236; 96/243; 423/220, 228, 229, 423/242.1
See application file for complete search history.

(56) References Cited

U.S. PATENT DOCUMENTS 2,810,627 A 10/1957 Johnstone et al.
3,752,877 A 8/1973 Beavon
(Continued)

FOREIGN PATENT DOCUMENTS

CN 1280032 A 1/2001
CN 201880482 U 6/2001
(Continued)

OTHER PUBLICATIONS

Wende Xiao and Zhiquan Wu, "Sulfur Dioxide Removal and Recovery," Chemical Industry Press (China), 143-145, May 2001.
(Continued)

*Primary Examiner* — Frank M Lawrence, Jr.
(74) *Attorney, Agent, or Firm* — Weiss & Arons LLP

(57) ABSTRACT

Waste heat recovery in an ammonia-based desulfurization and decarbonization system. The heat in the decarbonization system may be removed by using the heat of the process gas before desulfurization. The process gas before desulfurization may heat an intermediate medium through a gas heat exchanger. The intermediate medium may drive a refrigerator for refrigeration. A refrigerant may obtain the cooling capacity and may then cool the decarbonized process gas through a liquid-liquid heat exchanger.

19 Claims, 2 Drawing Sheets

(51) Int. Cl.
  *B01D 53/62* (2006.01)
  *B01D 53/78* (2006.01)
  *C09K 5/04* (2006.01)
  *F27D 17/10* (2025.01)

(56) References Cited

U.S. PATENT DOCUMENTS

| | | | |
|---|---|---|---|
| 3,983,217 | A | 9/1976 | Muraki et al. |
| 4,250,160 | A | 2/1981 | Eakman |
| 4,294,590 | A | 10/1981 | Linde et al. |
| 4,324,776 | A | 4/1982 | Kim |
| 4,378,977 | A | 4/1983 | Linde et al. |
| 4,552,747 | A | 11/1985 | Goar |
| 4,690,807 | A | 9/1987 | Saleem |
| 5,019,361 | A | 5/1991 | Hakka |
| 5,106,607 | A | 4/1992 | Chopin et al. |
| 5,362,458 | A | 11/1994 | Saleem et al. |
| 5,632,967 | A | 5/1997 | Nasato |
| 6,063,352 | A | 5/2000 | Risse et al. |
| 6,066,304 | A | 5/2000 | Freetly et al. |
| 6,139,807 | A | 10/2000 | Risse et al. |
| 6,221,325 | B1 | 4/2001 | Brown et al. |
| 6,444,185 | B1 | 9/2002 | Nougayrede et al. |
| 6,508,998 | B1 | 1/2003 | Nasato |
| 6,569,398 | B2 | 5/2003 | Fenderson |
| 6,616,908 | B2 | 9/2003 | Watson et al. |
| 6,776,974 | B1 | 8/2004 | Burmaster et al. |
| 6,991,771 | B2 | 1/2006 | Duncan et al. |
| 7,351,392 | B2 | 4/2008 | Chen et al. |
| 7,635,408 | B2 | 12/2009 | Mak et al. |
| 7,648,692 | B2 | 1/2010 | Chow et al. |
| 7,754,471 | B2 | 7/2010 | Chen et al. |
| 7,879,135 | B2 | 2/2011 | Ravikumar et al. |
| 7,910,077 | B2 | 3/2011 | Chow et al. |
| 8,178,070 | B2 | 5/2012 | Wong et al. |
| 8,206,669 | B2 | 6/2012 | Schaffer et al. |
| 8,361,432 | B2 | 1/2013 | Parekh et al. |
| 8,444,943 | B2 | 5/2013 | Lamar |
| 8,545,793 | B2 | 10/2013 | Thielert |
| 8,871,176 | B2 | 10/2014 | Liu et al. |
| 9,370,745 | B2 | 6/2016 | Xu et al. |
| 2003/0175190 | A1 | 9/2003 | Duncan et al. |
| 2007/0248518 | A1 | 10/2007 | Jung et al. |
| 2009/0004070 | A1 | 1/2009 | Chow et al. |
| 2011/0150733 | A1* | 6/2011 | Dube ............... B01D 53/1493 423/243.06 |
| 2011/0195008 | A1 | 8/2011 | Menzel et al. |
| 2011/0243822 | A1 | 10/2011 | Mortson |
| 2012/0318141 | A1* | 12/2012 | Tsujiuchi ............ B01D 53/1475 96/242 |
| 2015/0352489 | A1 | 12/2015 | Luo et al. |
| 2019/0232215 | A1* | 8/2019 | Fujita ............... B01D 53/1475 |
| 2020/0147570 | A1* | 5/2020 | Kong .................... C01B 3/48 |
| 2023/0364553 | A1* | 11/2023 | Luo .................... B01D 53/75 |

FOREIGN PATENT DOCUMENTS

| | | | |
|---|---|---|---|
| CN | 1377722 | A | 11/2002 |
| CN | 1178735 | C | 4/2003 |
| CN | 1408464 | A | 4/2003 |
| CN | 1164480 | C | 9/2004 |
| CN | 2640584 | Y | 9/2004 |
| CN | 2640585 | Y | 9/2004 |
| CN | 2668235 | Y | 1/2005 |
| CN | 1617831 | A | 5/2005 |
| CN | 2746971 | Y | 12/2005 |
| CN | 2746972 | Y | 12/2005 |
| CN | 2746973 | Y | 12/2005 |
| CN | 2754711 | Y | 2/2006 |
| CN | 1251965 | C | 4/2006 |
| CN | 2772609 | Y | 4/2006 |
| CN | 2778373 | Y | 5/2006 |
| CN | 2799059 | Y | 7/2006 |
| CN | 2799060 | Y | 7/2006 |
| CN | 1283346 | C | 11/2006 |
| CN | 1321723 | C | 6/2007 |
| CN | 101085410 | A | 12/2007 |
| CN | 201030298 | Y | 3/2008 |
| CN | 201052456 | Y | 4/2008 |
| CN | 100395006 | C | 6/2008 |
| CN | 201109711 | Y | 9/2008 |
| CN | 100428979 | C | 10/2008 |
| CN | 201129965 | Y | 10/2008 |
| CN | 201132102 | Y | 10/2008 |
| CN | 101352642 | A | 1/2009 |
| CN | 201179415 | Y | 1/2009 |
| CN | 100460045 | C | 2/2009 |
| CN | 100475313 | C | 4/2009 |
| CN | 101422693 | A | 5/2009 |
| CN | 201231130 | Y | 5/2009 |
| CN | 101524620 | | 9/2009 |
| CN | 201320447 | Y | 10/2009 |
| CN | 201333376 | Y | 10/2009 |
| CN | 101575103 | A | 11/2009 |
| CN | 101585511 | A | 11/2009 |
| CN | 201380037 | Y | 1/2010 |
| CN | 201380038 | Y | 1/2010 |
| CN | 201380039 | Y | 1/2010 |
| CN | 201380040 | Y | 1/2010 |
| CN | 100588608 | C | 2/2010 |
| CN | 101642629 | A | 2/2010 |
| CN | 201423237 | Y | 3/2010 |
| CN | 101274750 | B | 6/2010 |
| CN | 101745303 | A | 6/2010 |
| CN | 201492952 | U | 6/2010 |
| CN | 201529487 | U | 7/2010 |
| CN | 201529488 | U | 7/2010 |
| CN | 201537456 | U | 8/2010 |
| CN | 101274196 | B | 12/2010 |
| CN | 101182926 | B | 1/2011 |
| CN | 101519192 | B | 2/2011 |
| CN | 101579600 | B | 4/2011 |
| CN | 102000490 | A | 4/2011 |
| CN | 102012034 | A | 4/2011 |
| CN | 101456541 | B | 5/2011 |
| CN | 101576261 | B | 5/2011 |
| CN | 101579602 | B | 5/2011 |
| CN | 102061206 | A | 5/2011 |
| CN | 101274204 | B | 6/2011 |
| CN | 101670231 | B | 8/2011 |
| CN | 201912884 | U | 8/2011 |
| CN | 201912885 | U | 8/2011 |
| CN | 201944861 | U | 8/2011 |
| CN | 201949808 | U | 8/2011 |
| CN | 102205202 | A | 10/2011 |
| CN | 102380305 | A | 3/2012 |
| CN | 102381685 | A | 3/2012 |
| CN | 102381686 | A | 3/2012 |
| CN | 102423597 | A | 4/2012 |
| CN | 101791517 | B | 5/2012 |
| CN | 102451604 | A | 5/2012 |
| CN | 101456540 | B | 7/2012 |
| CN | 101574614 | B | 7/2012 |
| CN | 101637685 | B | 7/2012 |
| CN | 102631827 | A | 8/2012 |
| CN | 202460375 | U | 10/2012 |
| CN | 202460420 | U | 10/2012 |
| CN | 202460438 | U | 10/2012 |
| CN | 101530727 | B | 11/2012 |
| CN | 101955828 | B | 11/2012 |
| CN | 102211762 | B | 11/2012 |
| CN | 101972592 | B | 12/2012 |
| CN | 202538627 | U | 12/2012 |
| CN | 101934191 | B | 1/2013 |
| CN | 102049186 | B | 1/2013 |
| CN | 202725003 | U | 2/2013 |
| CN | 202751942 | U | 2/2013 |
| CN | 202754802 | U | 2/2013 |
| CN | 202829575 | U | 3/2013 |
| CN | 101418246 | B | 4/2013 |
| CN | 202912691 | U | 5/2013 |
| CN | 202924730 | U | 5/2013 |
| CN | 202953829 | U | 5/2013 |

(56) References Cited

FOREIGN PATENT DOCUMENTS

| | | |
|---|---|---|
| CN | 102381687 B | 8/2013 |
| CN | 203159221 U | 8/2013 |
| CN | 203264545 U | 11/2013 |
| CN | 203291675 U | 11/2013 |
| CN | 102489140 B | 12/2013 |
| CN | 103418223 A | 12/2013 |
| CN | 203329558 U | 12/2013 |
| CN | 203612955 U | 5/2014 |
| CN | 102942162 B | 8/2014 |
| CN | 203781842 U | 8/2014 |
| CN | 102910593 B | 9/2014 |
| CN | 102847431 B | 10/2014 |
| CN | 103204477 B | 10/2014 |
| CN | 103446859 B | 10/2014 |
| CN | 104138713 A | 11/2014 |
| CN | 103301732 B | 1/2015 |
| CN | 103041679 B | 2/2015 |
| CN | 103301736 B | 2/2015 |
| CN | 104368231 A | 2/2015 |
| CN | 204134465 U | 2/2015 |
| CN | 204151066 U | 2/2015 |
| CN | 102895870 B | 3/2015 |
| CN | 102923670 B | 3/2015 |
| CN | 204198421 U | 3/2015 |
| CN | 103223292 B | 4/2015 |
| CN | 104511228 A | 4/2015 |
| CN | 104555939 A | 4/2015 |
| CN | 204233957 U | 4/2015 |
| CN | 103112831 B | 5/2015 |
| CN | 204352660 U | 5/2015 |
| CN | 103301705 B | 8/2015 |
| CN | 103482583 B | 9/2015 |
| CN | 104923046 A | 9/2015 |
| CN | 104927894 A | 9/2015 |
| CN | 104941423 A | 9/2015 |
| CN | 104946296 A | 9/2015 |
| CN | 103463949 B | 12/2015 |
| CN | 105110819 A | 12/2015 |
| CN | 105126573 A | 12/2015 |
| CN | 104353258 B | 1/2016 |
| CN | 105240826 A | 1/2016 |
| CN | 104249995 B | 4/2016 |
| CN | 205235588 U | 5/2016 |
| CN | 205245200 U | 5/2016 |
| CN | 205252720 U | 5/2016 |
| CN | 205252721 U | 5/2016 |
| CN | 205252722 U | 5/2016 |
| CN | 205262780 U | 5/2016 |
| CN | 103822217 B | 6/2016 |
| CN | 105757688 A | 7/2016 |
| CN | 104555940 B | 8/2016 |
| CN | 105841168 A | 8/2016 |
| CN | 104524948 B | 9/2016 |
| CN | 205549846 U | 9/2016 |
| CN | 205562498 U | 9/2016 |
| CN | 103521060 B | 1/2017 |
| CN | 103939918 B | 1/2017 |
| CN | 104208992 B | 2/2017 |
| CN | 104258713 B | 2/2017 |
| CN | 104528659 B | 4/2017 |
| CN | 109945677 A | 6/2019 |
| CN | 209783367 U | 12/2019 |
| DE | 3733319 A1 | 9/1989 |
| EP | 165609 B1 | 6/1985 |
| EP | 212523 A2 | 3/1987 |
| JP | S47-043737 | 11/1972 |
| TW | 497985 | 8/2002 |
| WO | WO200507505 A1 | 8/2005 |
| WO | WO2005113429 A1 | 12/2005 |
| WO | WO2006113935 A2 | 10/2006 |
| WO | WO2012152919 A1 | 11/2012 |

OTHER PUBLICATIONS

Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.
"Introduction to FGD for China Shenhua Coal to Liquid(CTL) Project," Jiangnan Environmental Technology, Inc., 19$^{th}$ Annual Electric Power Conference and Exhibition, Apr. 13, 2017, Chicago, Illinois.
"Advantages & Application of Efficient Ammonia-Based Desulfurization Technology," Jiangnan Environmental Technology, Inc., 19$^{th}$ Annual Electric Power Conference and Exhibition, Apr. 13, 2017, Chicago, Illinois.
Google Patents English translation of CN1283346C date not provided.
Google Patents English translation of CN2640585Y date not provided.
Google Patents English translation of CN2772609Y date not provided.
Google Patents English translation of CN100428979C date not provided.
Google Patents English translation of CN201912885U date not provided.
Date not provided Google Patents English translation of CN10322392A date not provided.
Office Action issued by the Japanese Intellectual Property Office in Japanese Application No. 2017-123088, on Apr. 16, 2018.
Office Action issued in U.S. Appl. No. 14/829,905 on Nov. 16, 2015.
Office Action issued in U.S. Appl. No. 14/829,905 on Feb. 29, 2016.
Office Action issued in U.S. Appl. No. 14/829,909 on Apr. 15, 2016.
Office Action issued in U.S. Appl. No. 14/829,909 on Dec. 14, 2016.
Office Action issued in U.S. Appl. No. 14/829,909 on Feb. 14, 2017.
International Search Report issued for International Application No. PCT/CN2013/074657, Dec. 26, 2013.
International Search Report issued for International Application No. PCT/CN2014/087887, Jan. 14, 2015.
Supplementary European Search Report issued in European Application No. 13882863.7, Mar. 11, 2016.

* cited by examiner

METHOD AND DEVICE FOR WASTE HEAT RECOVERY IN AMMONIA-BASED DESULFURIZATION AND DECARBONIZATION SYSTEM

CROSS-REFERENCE TO RELATED APPLICATION

This application claims priority under 35 U.S.C. § 119 of Chinese Patent Application No. CN202210529871.7, filed on May 16, 2022, which is hereby incorporated in its entirety herein.

TECHNICAL FIELD

The present invention belongs to the technical field of environmental protection, and in particular relates to a method and a device for recovering waste heat in ammonia-based desulfurization and decarbonization system.

BACKGROUND

Industrial boilers are widely used in petroleum, chemical industry, domestic heating and other fields, and low-temperature flue gas and other low-temperature industrial gases are directly discharged. Although low-temperature gas waste heat is a low-quality energy, it has a huge potential for energy saving due to its high abundance. Also, with the aggravation of environmental pollution and energy shortage, China vigorously advocates energy conservation and emission reduction. Under this circumstance, enterprises pay more and more attention to how to utilize the waste heat of low-temperature gas generated in the production process.

CN105240826A discloses a low-temperature flue gas waste heat recovery system, which includes: a heat collecting tower, a liquid storage tank, a circulating liquid pump and a liquid heat exchanger; the low-temperature flue gas enters the heat collecting tower and comes into direct contact with the droplets of an intermediate fluid ejected from a nozzle inside the heat collecting tower for heat exchange, and the low-temperature flue gas is discharged from the heat collecting tower after heat exchange and sent to the liquid heat exchanger; the liquid heat exchanger is connected to the circulating liquid pump for receiving the intermediate fluid at the bottom of the heat collecting tower, and heat exchange between the liquids is carried out in the liquid heat exchanger, and the intermediate fluid passes through the liquid heat exchanger and flows to the nozzle of the heat collecting tower under the action of the head of the circulating liquid pump. This scheme only considers waste heat recovery from flue gas, and the recovered heat is used to heat boiler feed water, but it does not consider comprehensive energy utilization of waste heat recovery and flue gas desulfurization and decarbonization.

CN201410766487.4 proposes a process system and method for combined desulfurization and decarbonization of flue gas. The system finally obtains high-purity $SO_2$ and $CO_2$ gases separately, utilizes the temperature difference in the regeneration process of $SO_2$ and $CO_2$ and utilizes the waste heat of the $CO_2$ regeneration process as the heat source for $SO_2$ regeneration, and utilizes the liquid water obtained after $CO_2$ regeneration and separation as the cold source for gas-liquid separation after $SO_2$ regeneration to realize temperature cascade utilization inside the system, which fully utilizes the heat from the flue gas treatment process. However, this scheme does not consider the recovery and utilization of waste heat from flue gas before desulfurization.

CN201910225072.9 adopts a waste heat recovery technology through direct contact of flue gas and water, and combines with a high-efficiency water-water plate heat exchanger to realize the recovery and utilization of low-temperature flue gas waste heat, which achieves desulfurization as well, but still emits a large amount of $CO_2$.

CN201920148383.5 mentions a catalytic flue gas waste heat recovery and recycling system that can remove CO, which also uses an additional waste heat recovery device to recover heat in the flue gas.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

In FIG. 1 and FIG. 2, the reference numerals have the following meanings:
1. process gas;
2. gas heat exchanger;
3. refrigerator;
4. desulfurization equipment;
5. cooling equipment;
6. liquid collector;
7. decarbonization equipment;
8. cooling circulating pump;
9. plate heat exchanger;
10. decarbonization circulating pump;
11. plate heat exchanger;
12. ammonia removal equipment;
13. process gas after decarbonization;
14. gas heat exchanger intermediate medium;
15. refrigerator chilled water;
16. inlet chilled water;
17. returned chilled water;
18. cooling equipment circulating liquid distributor;
19. decarbonization equipment circulating liquid distributor.

DETAILED DESCRIPTION

Figure 1:
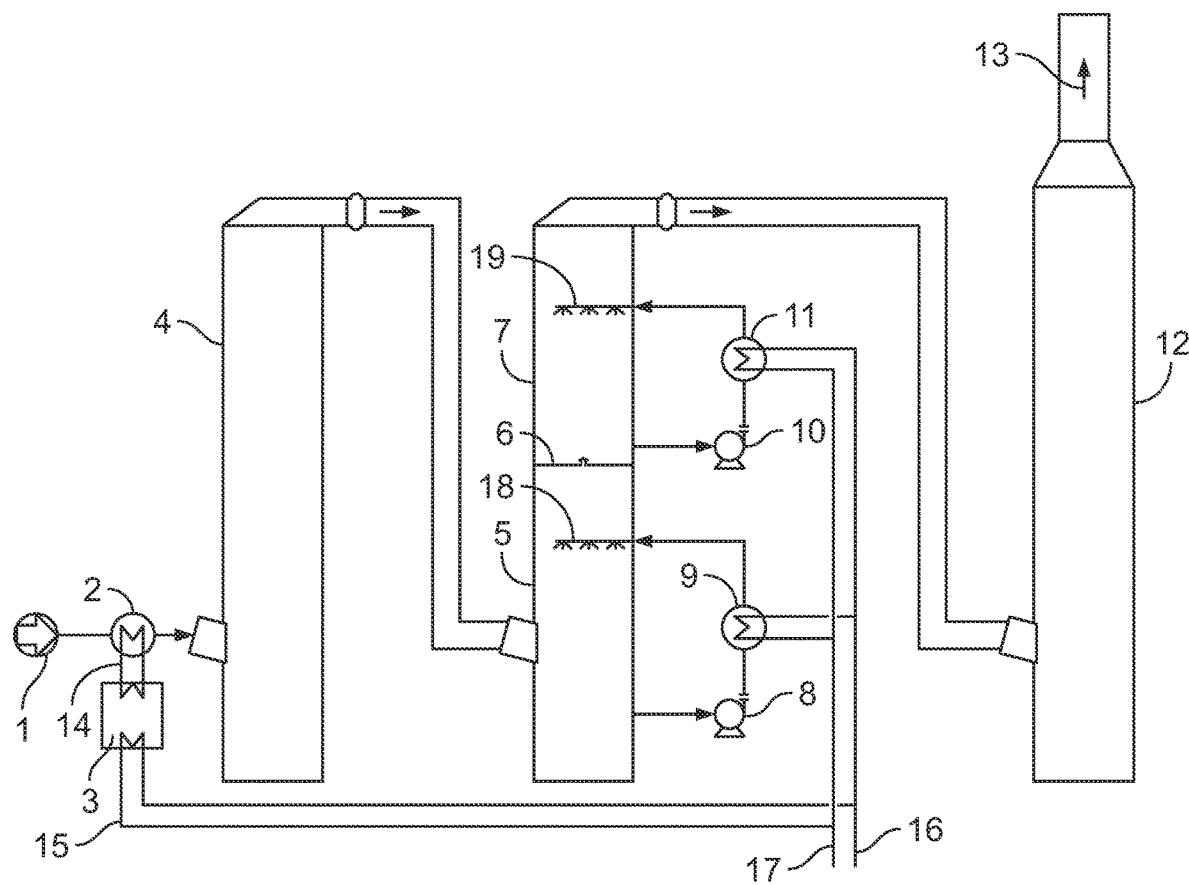
FIG. 1 is a schematic diagram in accordance with principles of the invention.

Apparatus and methods for waste heat recovery in an ammonia-based desulfurization and decarbonization system are provided.

The apparatus and methods may use the waste heat in the process gas before desulfurization to cool decarbonized process gas. Waste heat may be recovered effectively while carrying out desulfurization and decarbonization, and may result in energy saving and emission reduction.

In the apparatus and methods, heat of the process gas before desulfurization may be used to cool the decarbonized process gas; the process gas before desulfurization may heat an intermediate medium through a heat exchanger, and may drive, via the intermediate medium, a refrigerator for refrigeration; and the refrigerant in the refrigerator may obtain cooling capacity and may cool the decarbonized process gas through a liquid-liquid heat exchanger.

An objective of the present invention is to solve the above-mentioned problems in the prior art.

The inventors have surprisingly found that the objective of the present invention can be achieved by the following method and device described herein.

In one aspect, the present invention relates to a method for waste heat recovery in an ammonia-based desulfurization and decarbonization system, wherein the heat of the process gas before desulfurization may be used to cool the decarbonized process gas.

The process gases may include coal-fired boiler flue gas, catalytic cracking regeneration flue gas, sulfur recovery incineration tail gas, or the like. The process gas may include one or more of $CO_2$, $SO_2$, $O_2$, $N_2$ and dust particles.

The process gas before desulfurization may heat the intermediate medium through the process gas heat exchanger. The intermediate medium may drive the refrigerator for refrigeration. The refrigerant in the refrigerator may obtain cooling capacity and may then remove the heat in the decarbonization system through a circulating liquid. The circulating liquid refers to a circulating liquid associated with the cooling circulating pump or the decarbonization circulating pump, and may be a solution containing an ammonium salt. Both the cooling equipment and the decarbonization equipment may include a circulating liquid distribution unit. The circulating liquid distribution unit may include one or more of a circulating pump, a circulating pipe, and a circulating liquid distributor. The circulating liquid may be transported from the lower part of the equipment to the circulating liquid distributor through the circulating pump and the circulating pipe, and after coming into contact with the process gas, it may be collected at the lower part of the equipment. The circulation may be repeated in this way. The circulating liquid of the cooling equipment may be mainly composed of a solution containing more than 0 wt % to 5 wt % of ammonium sulfate (based on the total weight of the solution). The circulating liquid of the decarbonization equipment may be mainly composed of a solution including one or more of ammonium bicarbonate, ammonium carbonate, and ammonium carbamate.

The heated intermediate medium may include water.

The refrigerant may include water (preferably chilled water), alcohols, or combinations thereof. The alcohols may include one or more of monohydric alcohols, dihydric alcohols and polyhydric alcohols. The alcohols may include ethylene glycol, propylene glycol, etc.

The temperature of the process gas before desulfurization may be in the range 90-300° C., the range 110-180° C., or the range 120-170° C., and the temperature of the process gas after heat exchange through the gas heat exchanger may be in the range 90-120° C. or the range 95-110° C., and the temperature after desulfurization may be in the range 40-60° C. or the range 42-47° C.

The temperature of the intermediate medium entering the gas heat exchanger may be in the range 60-90° C., and the temperature of the intermediate medium leaving the gas heat exchanger may be in the range 70-100° C., wherein the former is lower than the latter.

The temperature of the refrigerant entering the refrigerator may be in the range 0° C. to 30° C. or the range 0° C. to 20° C., and the temperature of the refrigerant leaving the refrigerator may be in the range −10° C. to 20° C. or the range −10° C. to 10° C.

The refrigerant may be used to reduce the temperature of the process gas prior to decarbonization.

The refrigerant may be used to remove the heat of reaction in decarbonization. The refrigerant may be used to remove the heat of crystallization.

The cooling equipment may be located before (upstream of) decarbonization. The equipment may be provided with at least one layer of circulating liquid distribution unit. The refrigerant may reduce the temperature of the circulating liquid through the liquid-liquid heat exchanger.

The decarbonization equipment may include at least one layer of circulating liquid distribution unit. The refrigerant may reduce the temperature of the circulating liquid through the liquid-liquid heat exchanger.

The liquid-liquid heat exchanger may include a plate heat exchanger.

The apparatus may include a device for waste heat recovery in an ammonia-based desulfurization and decarbonization system. In the device, along the flow direction of the process gas, a waste heat recovery device, desulfurization equipment, cooling equipment, decarbonization equipment, and ammonia removal equipment are sequentially provided. The waste heat recovery device may include a gas heat exchanger, a refrigerator, and a liquid-liquid heat exchanger. The gas heat exchanger may be located before (upstream of) the desulfurization equipment. The refrigerator may be connected to the gas heat exchanger and the liquid-liquid heat exchanger through pipes. The liquid-liquid heat exchanger may be connected to the cooling equipment.

The cooling equipment may include at least one layer of circulating liquid unit which may include a circulating pump, a circulating pipe, and a circulating liquid distributor.

The liquid-liquid heat exchanger may be located on, or configured for heat exchange with, the outlet pipe of the circulating pump.

The liquid-liquid heat exchanger may include a plate heat exchanger.

Unless otherwise stated, the above-described features may be combined with each other.

Methods for waste heat recovery in an ammonia-based desulfurization and decarbonization system are provided. The method may include using the heat in process gas before desulfurization to remove heat from the decarbonization system.

An intermediate medium may be heated through a gas heat exchanger by using the process gas before desulfurization. The intermediate medium may drive a refrigerator for refrigeration. A refrigerant in the refrigerator may obtain a cooling capacity. The refrigerant may then remove heat from the decarbonization system through a circulating liquid. The heated intermediate medium may include water.

The temperature of the process gas before desulfurization may be in the range 90-300° C. The temperature of the process gas after heat exchange through the gas exchanger may be in the range 90-120° C. The temperature of the process gas after desulfurization may be in the range 40-60° C.

The temperature of the intermediate medium entering the gas heat exchanger may be in the range 60-90° C. The temperature of the intermediate medium leaving the gas heat exchanger may be in the range 70-100° C. The temperature of the intermediate medium entering the gas heat exchanger may be lower than the temperature of the intermediate medium leaving the gas heat exchanger.

The temperature of the refrigerant entering the refrigerator may be in the range 0° C. to 30° C. The temperature of the refrigerant leaving the refrigerator may be in the range −10° C. to 20° C.

The refrigerant may be configured to reduce the temperature of the process gas before decarbonization.

Cooling may be applied upstream of decarbonization. Cooling equipment may be provided with at least one layer of circulating liquid distribution. The refrigerant may reduce the temperature of the circulating liquid through a liquid-liquid heat exchanger.

The refrigerant may be configured to remove the heat of reaction in decarbonization. The refrigerant may be configured to remove the heat of crystallization.

The decarbonization equipment may be provided with at least one layer of circulating liquid distribution. The refrigerant may reduce the temperature of the circulating liquid through a liquid-liquid heat exchanger.

The refrigerant may include water. The refrigerant may include alcohols. The refrigerant may include a combination of water and alcohols.

Apparatus for waste heat recovery in an ammonia-based desulfurization and decarbonization system may be provided. The apparatus may include a waste heat recovery device. The waste heat recovery device may include a gas heat exchanger. The waste heat recovery device may include a liquid-liquid heat exchanger. The waste heat recovery device may include a refrigerator. The refrigerator may be connected to the gas heat exchanger. The refrigerator may be connected to the liquid-liquid heat exchanger. The connection between the refrigerator and the gas heat exchanger may be via pipes. The connection between the refrigerator and the liquid-liquid heat exchanger may be via pipes.

The apparatus may also include desulfurization equipment. The desulfurization equipment may be located downstream of the gas heat exchanger.

The apparatus may also include cooling equipment. The cooling equipment may be connected to the liquid-liquid heat exchanger.

The apparatus may also include decarbonization equipment. The apparatus may also include ammonia removal equipment. Process gas may flow through the waste heat recovery device, the desulfurization equipment, the cooling equipment, the decarbonization equipment and the ammonia removal equipment. The flow of the process gas may be in the following sequence: the waste heat recover device, the desulfurization equipment, the cooling equipment, the decarbonization equipment and the ammonia removal equipment.

The cooling equipment may be provided with at least one layer of circulating liquid distribution. The circulating liquid distribution may include a circulating pump, a circulating pipe and/or a circulating liquid distributor.

The liquid-liquid heat exchanger may be located on an outlet pipe of a circulating pump.

Apparatus for waste heat recovery in an ammonia-based desulfurization and decarbonization system are provided. The apparatus may include a waste heat recovery device. The waste heat recovery device may include a gas heat exchanger. The waste heat recovery device may include a liquid-liquid heat exchanger. The liquid-liquid heat exchanger may be a plate heat exchanger. The waste heat recovery device may include a refrigerator. The refrigerator may be connected to a gas heat exchanger. The connection between the refrigerator and the gas heat exchanger may be via pipes. The refrigerator may be connected to a liquid-liquid heat exchanger. The connection between the refrigerator and the liquid-liquid heat exchanger may be via pipes.

The apparatus may also include desulfurization equipment. The desulfurization equipment may be located downstream of the gas heat exchanger.

The apparatus may also include cooling equipment. The cooling equipment may be connected to the liquid-liquid heat exchanger.

The apparatus may also include decarbonization equipment. The apparatus may also include ammonia removal equipment. Process gas may flow through the waste heat recovery device, the desulfurization equipment, the cooling equipment, the decarbonization equipment and the ammonia equipment. The process gas flow may be in the following sequence: the waste heat recovery device, the desulfurization equipment, the cooling equipment, the decarbonization equipment and the ammonia equipment.

The cooling equipment may be provided with at least one layer of circulating liquid distribution. The one layer of circulating liquid distribution may include a circulating pump, a circulating pipe and a circulating liquid distributor.

The liquid-liquid heat exchanger may be located on an outlet pipe of a circulating pump.

Embodiments of the present invention will be described in detail below through embodiments, but those skilled in the art will understand that the following embodiments are only for illustrating the present invention, rather than limiting the scope of the present invention.

Illustrative embodiments of apparatus and methods in accordance with the principles of the invention will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the present invention.

Example 1

FIG. 1 shows apparatus corresponding to Example 1. The temperature of process gas 1 (namely, coal-fired boiler flue gas, which contains $CO_2$, $SO_2$, $O_2$, $N_2$ and dust particles) was 128° C., and the flue gas flow was 857662 $Nm^3/h$. After passing through a gas heat exchanger 2, the temperature of the flue gas dropped to 100° C., and the flue gas entered desulfurization equipment 4. An intermediate medium 14 (namely, water) was heated from 72° C. to 96° C. after passing through the gas heat exchanger 2, and then was passed to a refrigerator 3 to lower the temperature of chilled water 15 from 17° C. to 7° C.

After desulfurization, the temperature of the gas was 45° C., and it entered cooling equipment 5 and decarbonization equipment 7 in sequence. The cooling equipment 5 and the decarbonization equipment 7 included tower structures that were separated by a liquid collector 6. The liquid collector 6 includes a tray gas cap structure that allowed gas to enter the decarbonization equipment 7 from the cooling equipment 5 through the gas cap. Both the cooling equipment 5 and the decarbonization equipment 7 were provided with a circulating liquid distribution unit. The circulating liquid distribution unit included a circulating pump, a circulating pipe, and a circulating liquid distributor. The circulating liquid was transported from the lower part of the equipment to the circulating liquid distributor through the circulating pump and the circulating pipe, and after coming into contact with the process gas, it was collected at the lower part of the equipment, and the circulation is repeated in this way. A cooling equipment circulating liquid distributor 18 was provided inside the cooling equipment 5, and under the action of a circulating pump 8 and a plate heat exchanger 9, the temperature of the gas was lowered to 25° C. through chilled water 15 and chilled water 16 provided from the outside. The circulating liquid of the cooling equipment 5 was mainly composed of a solution containing 2 wt % ammonium sulfate (based on the total weight of the solution). After passing through the liquid collector 6, the flue gas entered the decarbonization equipment 7. A decarbonization equipment circulating liquid distributor 19 was provided inside the decarbonization equipment 7. Under the action of a circulating pump 10 and a plate heat exchanger 11, the heat of reaction and heat of crystallization were removed, and ammonium bicarbonate was produced. The circulating liquid in the decarbonization equipment 7 was mainly composed of a solution containing ammonium bicarbonate, ammonium carbonate, and ammonium carbamate. The decarbonized gas entered ammonia removal equipment 12, ammonia escape was controlled, and then 13 was discharged.

The consumption of external chilled water was 2339 t/h. Meanwhile, the temperature of the gas before desulfurization was lowered due to the waste heat recovery, the desulfurization temperature was 45° C., the ammonia escape after desulfurization was only 2 mg/Nm$^3$, and the makeup water in the desulfurization system was 6 t/h.

Ammonia escape was determined with reference to HJ 533-2009, and gas parameters such as flue gas flow were determined with reference to GBT 16157-1996.

Example 2

Figure 2:
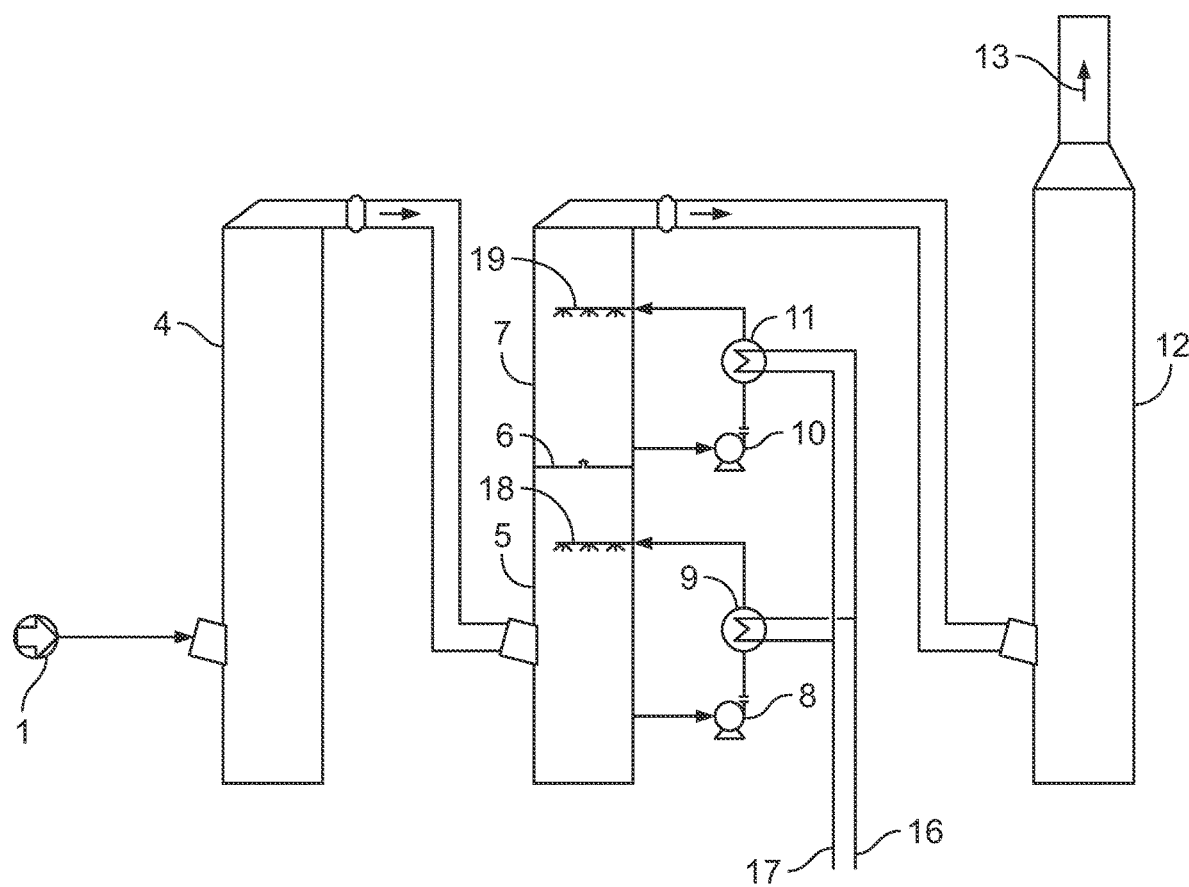
FIG. 2 is a schematic diagram in accordance with principles of the invention.

FIG. 2 shows apparatus corresponding to Example 2. The temperature of process gas 1 (the same coal-fired boiler flue gas as in Embodiment 1, which contains $CO_2$, $SO_2$, $O_2$, $N_2$ and dust particles) was 128° C., and the flue gas flow was 857662 Nm3/h. The process gas directly entered desulfurization equipment 4 for desulfurization.

After desulfurization, the temperature of the gas was 49° C., and it entered cooling equipment 5 and decarbonization equipment 7 in sequence. The cooling equipment 5 and the decarbonization equipment 7 included tower structures which were separated by a liquid collector 6. The liquid collector 6 was of a tray gas cap structure, which allows gas to enter the decarbonization equipment 7 from the cooling equipment 5 through the gas cap. Both the cooling equipment 5 and the decarbonization equipment 7 were provided with a circulating liquid distribution unit. The circulating liquid distribution unit included a circulating pump, a circulating pipe, and a circulating liquid distributor. The circulating liquid was transported from the lower part of the equipment to the circulating liquid distributor through the circulating pump and the circulating pipe, and after coming into contact with the process gas, it was collected at the lower part of the equipment, and the circulation was repeated in this way. A cooling equipment circulating liquid distributor 18 was provided inside the cooling equipment 5, and under the action of a circulating pump 8 and a plate heat exchanger 9, the temperature of the gas was lowered to 25° C. through chilled water 16 provided from the outside. The circulating liquid of cooling equipment 5 was mainly composed of a solution containing 2 wt % ammonium sulfate (based on the total weight of the solution). After passing through the liquid collector 6, the flue gas entered the decarbonization equipment 7. A decarbonization equipment circulating liquid distributor 19 was provided inside the decarbonization equipment 7. Under the action of a circulating pump 10 and a plate heat exchanger 11, the heat of reaction and heat of crystallization were removed, and ammonium bicarbonate was produced. The circulating liquid in the decarbonization equipment 7 was mainly composed of a solution containing ammonium bicarbonate, ammonium carbonate, and ammonium carbamate. The decarbonized gas flowed to ammonia removal equipment 12, ammonia escape is controlled, and then 13 is discharged.

The consumption of external chilled water was 4267 t/h. The desulfurization temperature was 49° C., the ammonia escape after desulfurization was 5 mg/Nm$^3$, and the makeup water in the desulfurization system was 21 t/h.

Ammonia escape was determined with reference to HJ 533-2009, and gas parameters such as flue gas flow were determined with reference to GBT 16157-1996.

It can be clearly seen from the above that, compared with the comparative embodiment, the embodiment of the present application significantly reduces the consumption of chilled water, the desulfurization temperature, the ammonia escape after desulfurization, and makeup water in the desulfurization system.

Illustrative Features May Include:

1. A method for waste heat recovery in an ammonia-based desulfurization and decarbonization system, wherein the heat in process gas before desulfurization is used to remove heat from decarbonization system.

2. The method according to aspect 1, wherein an intermediate medium is heated through a gas heat exchanger by using the process gas before desulfurization, the intermediate medium drives a refrigerator for refrigeration, and a refrigerant in the refrigerator obtains the cooling capacity and then removes heat from decarbonization system through a circulating liquid.

3. The method according to aspect 2, wherein the heated intermediate medium includes water.

4. The method according to aspect 2 or 3, wherein the refrigerant includes water, alcohols, or a combination thereof.

5. The method according to aspect 2 or 3, wherein the temperature of the process gas before desulfurization is 90-300° C., preferably 110-180° C., more preferably 120-170° C., the temperature of the process gas after heat exchange through the gas heat exchanger is 90-120° C., and the temperature after desulfurization is 40-60° C.

6. The method according to aspect 2 or 3, wherein the temperature of the intermediate medium entering the gas heat exchanger is 60-90° C., the temperature of the intermediate medium leaving the gas heat exchanger is 70-100° C., and the former is lower than the latter.

7. The method according to aspect 2 or 3, wherein the temperature of the refrigerant entering the refrigerator is 0° C. to 30° C., and the temperature of the refrigerant leaving the refrigerator is −10° C. to 20° C.

8. The method according to aspect 2 or 3, wherein the refrigerant is capable of being used to reduce the temperature of the process gas before decarbonization.

9. The method according to aspect 2 or 3, wherein the refrigerant is capable of being used to remove the heat of reaction in decarbonization and heat of crystallization.

10. The method according to aspect 8, wherein cooling equipment is provided before decarbonization, the equipment is provided with at least one layer of circulating liquid distribution unit, the refrigerant reduces the temperature of the circulating liquid through a liquid-liquid heat exchanger, and the liquid-liquid heat exchanger is preferably a plate heat exchanger.

11. The method according to aspect 9, wherein the decarbonization equipment is provided with at least one layer of circulating liquid distribution unit, and the refrigerant reduces the temperature of the circulating liquid through a liquid-liquid heat exchanger.

12. A device for waste heat recovery in an ammonia-based desulfurization and decarbonization system, wherein along the flow direction of the process gas, a waste heat recovery device, desulfurization equipment, cooling equipment, decarbonization equipment, and ammonia removal equipment are provided in sequence, wherein the waste heat recovery device includes a gas heat exchanger, a refrigerator, and a liquid-liquid heat exchanger, the gas heat exchanger is located before the desulfurization equipment, the refrigerator is connected to the gas heat exchanger and the liquid-liquid heat exchanger through pipes, the liquid-liquid heat exchanger is connected to the cooling equipment, and the liquid-liquid heat exchanger is preferably a plate heat exchanger.

13. The device according to aspect 12, wherein the cooling equipment is provided with at least one layer of circulating liquid distribution unit, including a circulating pump, a circulating pipe, and a circulating liquid distributor.

14. The device according to aspect 12 or 13, wherein the liquid-liquid heat exchanger is located on the outlet pipe of the circulating pump.

The specific embodiments described above have further described the objectives, technical solutions and beneficial effects of the present invention in detail. It should be understood that the above descriptions are only specific embodiments of the present invention and are not intended to limit the protection scope of the present invention. Any modification, equivalent replacement, improvement, etc., made within the spirit and principles of the present invention shall be included in the protection scope of the present invention.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus and methods for waste heat recovery in ammonia-based desulfurization and decarbonization system have been provided. Persons skilled in the art will appreciate that the present invention may be practiced by other than the described embodiments, which are presented for purposes of illustration rather than of limitation. The present invention is limited only by the claims that follow.

What is claimed is:

1. A method for waste heat recovery in an ammonia-based desulfurization and decarbonization system, the method comprising:
using heat of process gas before desulfurization to remove heat from the decarbonization system.

2. The method of claim 1 wherein an intermediate medium is heated through a gas heat exchanger by using the process gas before desulfurization, the intermediate medium drives a refrigerator for refrigeration, and a refrigerant in the refrigerator obtains a cooling capacity and then removes heat of the decarbonization system through a circulating liquid.

3. The method of claim 2 wherein the heated intermediate medium includes water.

4. The method of claim 2 wherein the temperature of the process gas before desulfurization is in the range 90-300° C., the temperature of the process gas after heat exchange through the gas heat exchanger is in the range 90-120° C., and the temperature of the process gas after desulfurization is in the range 40-60° C.

5. The method of claim 2 wherein the temperature of the intermediate medium entering the gas heat exchanger is in the range 60-90° C., the temperature of the intermediate medium leaving the gas heat exchanger is in the range 70-100° C., and the temperature of the intermediate medium entering the gas heat exchanger is lower than the temperature of the intermediate medium leaving the gas heat exchanger.

6. The method of claim 2 wherein the temperature of the refrigerant entering the refrigerator is in the range 0° C. to 30° C., and the temperature of the refrigerant leaving the refrigerator is in the range −10° C. to 20° C.

7. The method according to claim 2 wherein the refrigerant is configured to reduce the temperature of the process gas before decarbonization.

8. The method according to claim 7 wherein:
cooling is applied, upstream of decarbonization, with cooling equipment;
the cooling equipment is provided with at least one layer of circulating liquid distribution; and
the refrigerant reduces the temperature of the circulating liquid through a liquid-liquid heat exchanger.

9. The method of claim 2 wherein the refrigerant is configured to remove, in decarbonization equipment, heat of reaction and heat of crystallization.

10. The method according to claim 9 wherein:
the decarbonization equipment includes at least one layer of circulating liquid distribution; and
the refrigerant is configured to reduce the temperature of the circulating liquid through a liquid-liquid heat exchanger.

11. The method according to claim 2 wherein the refrigerant includes water.

12. The method according to claim 2 wherein the refrigerant includes alcohol.

13. The method according to claim 2 wherein the refrigerant includes a combination of water and alcohol.

14. An apparatus for waste heat recovery in an ammonia-based desulfurization and decarbonization system, the apparatus comprising:
a waste heat recovery device including:
a gas heat exchanger;
a liquid-liquid heat exchanger; and
a refrigerator connected, via pipes, to the gas heat exchanger and the liquid-liquid heat exchanger; and
desulfurization equipment located downstream of the gas heat exchanger;
cooling equipment connected to the liquid-liquid heat exchanger;
decarbonization equipment; and
ammonia removal equipment;
wherein, in operation, process gas flows through the waste heat recovery device, the desulfurization equipment, the cooling equipment, the decarbonization equipment and the ammonia removal equipment, in sequence.

15. The apparatus according to claim 14 wherein the cooling equipment includes at least one layer of circulating liquid distribution, the layer including a circulating pump, a circulating pipe, and a circulating liquid distributor.

16. The apparatus according to claim 14 wherein the liquid-liquid heat exchanger is located on an outlet pipe of a circulating pump.

17. An apparatus for waste heat recovery in an ammonia-based desulfurization and decarbonization system, the apparatus comprising:
  a waste heat recovery device comprising:
    a gas heat exchanger;
    a liquid-liquid heat exchanger including a plate heat exchanger;
    a refrigerator connected, via pipes, to the gas heat exchanger and the liquid-liquid heat exchanger; and
  desulfurization equipment located downstream of the gas heat exchanger;
  cooling equipment connected to the liquid-liquid heat exchanger;
  decarbonization equipment; and
  ammonia removal equipment;
wherein, in operation, process gas flows through the waste heat recovery device, the desulfurization equipment, the cooling equipment, the decarbonization equipment and the ammonia removal equipment, in sequence.

18. The apparatus according to claim 17 wherein the cooling equipment includes at least one layer of circulating liquid distribution, the layer including a circulating pump, a circulating pipe, and a circulating liquid distributor.

19. The apparatus according to claim 17 wherein the liquid-liquid heat exchanger is located on an outlet pipe of a circulating pump.

\* \* \* \* \*